Feb. 9, 1960  O. HOLSTEIN  2,924,317
CLUTCH APPARATUS
Filed Jan. 30, 1957

INVENTOR
O. HOLSTEIN
BY *Robert Harding Jr*
ATTORNEY

2,924,317

CLUTCH APPARATUS

Otto Holstein, Pforzheim, Germany, assignor to International Standard Electric Corporation, New York, N.Y., a corporation of Delaware Application January 30, 1957, Serial No. 637,254

Claims priority, application Germany February 4, 1956

7 Claims. (Cl. 192—48)

This invention relates to a clutch or coupling apparatus of the positive type and more particularly to an improved arrangement for maintaining the movable part of the clutch in a predetermined angular position when disengaged.

In certain apparatus where driving and driven members of a clutch are coupled by means of complementary engaging surfaces such for instance as saw shaped teeth, it is necessary to cause disengagement of the teeth and after disengagement of the teeth, to maintain the driven portion of the clutch in a precise angular position. Such a requirement would be present in the printing telegraph art.

In the printing telegraph art it is customary to have rotatable toothed clutches wherein a driving member coupled to a rotating shaft is adapted to drive a driven member upon the release of a clutch throwout lever which is removed from the path of the cam surface on a projection on the given clutch member and which cam surface causes the driven member to be axially moved along the rotating shaft out of engagement with the driving member against the tension of a compression spring. The compression spring must have sufficient tension to urge the driven member into mesh with the driving member when the clutch throwout lever is removed from the path and from contact with the cam surface of the driven member. The possibility exists that the tension of the compression spring may urge the driven member against the clutch throwout lever with such force that the driven member may tend to rotate due to the inclined surface of the cam co-acting with the clutch throwout lever thereby altering the angular position of the driven member. It is desirable and necessary in the printing telegraph art that such spurious rotation be avoided.

This invention overcomes the disadvantage outlined above in that means are provided for maintaining the driven member in the exact angular position that it assumed upon disengagement from the driving member.

Accordingly it is an object of the invention to maintain a driven member of a clutch in the exact angular position it assumed upon disengagement from the driving member of said clutch.

It is a further object of the invention to overcome the tension of a clutch engaging spring after disengagement of a driven member from the driving member of the clutch and which engaging spring would normally cause angular rotation of said driven member after disengagement thereof from the driving member.

It is another object of the invention to provide an apparatus whereby only a slight force is required for the engagement of the clutch members.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
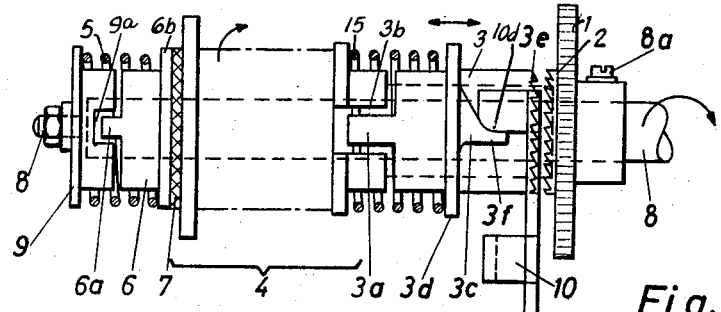
Fig. 1 is an elevational view of a clutch apparatus utilizing my invention wherein a rotating shaft is caused to be coupled to a driven clutch member.

Referring now to Fig. 1, there is shown in elevation, a gear 1 having attached thereto one-half of a positive clutch consisting of toothed portion 2 and fixedly attached to the rotating shaft 8 by means of set screw 8a. The clutch also includes a driven member 3 which has toothed surface 3e, and which teeth are complementarily shaped to the teeth 2 of the driving member. The driven member 3 is hollow and is adapted to rotate about shaft 8. At the opposite end of the driven member 3 there is formed a pair of diametrically opposed teeth 3b extending axially from the end of the driven element 3 and which teeth cooperate with complementary recesses in the intermediate portion 4. The driven member 3 is also provided intermediate its ends with a first cam surface 3c which includes a limiting stop 3f at the end thereof. The driven member 3 also includes a cam surface 3d whose purpose will be later explained. Intermediate the cam surface 3d and the member 4, there is a compression spring 15 which tends to normally urge the driven element 3 axially along the shaft 8 in the direction of the driving member 2.

At the distant end of shaft 8 there is connected a member 9 which is provided with a pair of diametrically oppositely disposed recesses 9a. There is provided a cooperating member 6 having at one end thereof a pair of diametrically opposed teeth 6a which are complementary to the slots 9a. The other end of the element 6 is provided with a flange portion 6b. A compression spring 5 is interposed between the member 9 and the flange 6b and tends to normally urge the element 6 in a right-hand direction. On the right side of the flange 6b there is provided friction coupling material 7 which may consist for instance of a felt washer and which element constitutes a friction coupling between the element 6 and the member 4. It will be seen thus far that the spring 5 normally urges the friction coupling 7 into engagement with the member 4 and thereby rotary movement is imparted to the member 4 by means of the cooperation of the teeth 6a which are rotated by the member 9. The rotary movement imparted to the member 4 is transmitted to the driven member 3 due to the coupling between the teeth 3a and the slots 3b in the member 4.

Figure 4:
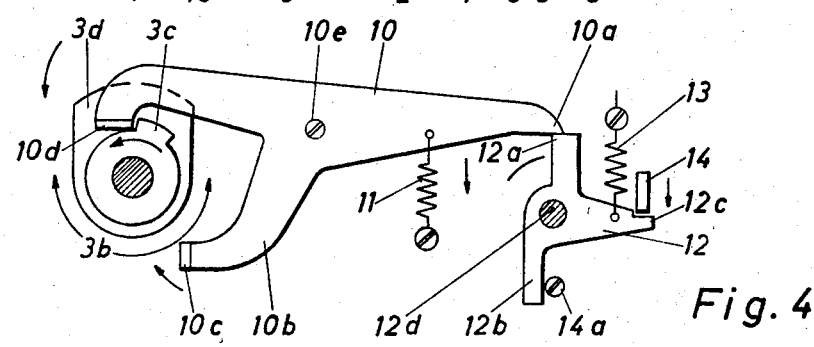
Fig. 4 is an end view of a portion of the structure shown in Fig. 1 taken along the line 4—4 therein.

Under the cumulative tension exerted by the springs 5 and 15, the driven clutch element 3 is urged into engagement with the driving member 2. In order to disengage the driven member 3, there is provided a clutch throwout lever 10 which pivots about pivot 10e as shown in Fig. 4 and is provided with a pair of bifurcated ends 10b and 10d. The lever 10 is adapted to pivot in directions normal to the axis of the shaft 8. The portion 10d of the lever 10 and constituting one of the bifurcated ends thereof is adapted to cooperate with the cam surface 3c when the lever 10 is pivoted so that the portion 10d lies in the path of said cam.

The driven clutch member 3 will tend to move axially along the shaft 8 toward the left due to the action of the cam surface 3c on the portion 10d of the clutch throwout lever until the stop portion 3f of the cam abuts under the portion 10d of the lever and this axial movement is sufficient to disengage the teeth 3e from the teeth 2. The element 3 however, is provided with a rotating force in the same direction as the direction of rotation of the shaft 8 by means of the friction coupling 7 and thereby the springs 5 and 15 will not tend to urge the cam surface 3c against the lever portion 10d with such force that the cam 3d will tend to rotate in an opposite direction due to the normal tendency of the inclined surface 3c to co-act against the portion 10d of the lever 10.

Figure 2:
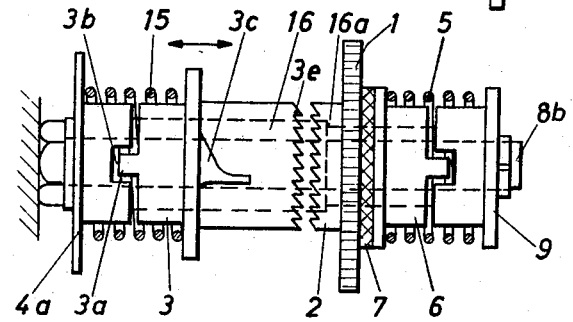
Fig. 2 is an elevational view of a modification of my invention and shows a driving arrangement consisting of a hollow sleeve rotating on a stationary axle.

Fig. 2 represents a modification of my invention and for the sake of clarity the clutch throwout lever 10 is not shown.

In Fig. 2 there is shown a rotating sleeve 16 which sleeve rotates about the fixed axle 8b. The driven member 3 of the clutch is coupled to the member 4a by means of the teeth 3a. The member 4a is fixedly attached to the hollow sleeve 16. The driven member 3 is adapted to slide axially along the sleeve 16 so that its toothed portion 3e may slide into engagement with the toothed portion 2 of the driving member. The sleeve 16 is provided with a shoulder 16a as shown and the driving member is provided with a complementary shoulder on the inner surface thereof so that the shoulder 16a acts as a limiting stop to leftward axial movement thereof. Such leftward movement is caused by the compression spring 5 which normally urges the driving member in that direction via the friction coupling 7. The portion 9 is fixedly coupled to the sleeve 16 and imparts rotary motion thereto by means of the friction coupling 7. The rotary sleeve 16 rotates the driven member 3 and thereby maintains the throwout cam 3c into contact with the clutch throwout lever 10 (not shown) in a manner similar to that explained with respect to Fig. 1. Upon disengagement of the driven member 3 from the driving member 2 it is urged in the same rotary direction by reason of the coupling with sleeve 16 and the friction coupling 7 tends to normally rotate the sleeve causing the throwout cam 3c to be maintained in precise angular position as explained in connection with Fig. 1.

Figure 3:
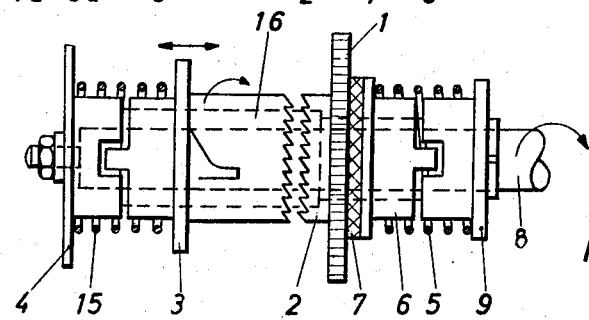
Fig. 3 is another modification of my invention and is similar to the showing in Fig. 2 with the exception that the rotatable sleeve rotates about an axle which is selectively rotated.

Fig. 3 represents another embodiment of the invention and is very similar to Fig. 2 with the exception that the hollow sleeve 16 rotates together with the shaft 8 instead of about the stationary axle. The rotatable shaft 8 is firmly connected with the member 9, the hollow sleeve 16 and the member 4a. Axially displaceable on the hollow sleeve 16 are the clutch members 3 and 6, and the gear 1 with the toothed portion 2 are rotatable about the sleeve 16. Accordingly, the gear 1 is coupled to member 9 and, consequently, to the shaft 8, when the clutch member 3 is released with its throwout cam 3c from the portion 10d of the throwout lever (Fig. 4). The teeth 3e of the clutch member 3 are thereby in engagement with the toothed portion 2 of gear 1. If the portion 10d is moved again into the path of the throwout cam 3c of the clutch member 3 then this clutch member 3, by the starting rotation of the throwout cam 3c, is moved towards the portion 10d leftwardly against the tension of the spring 15. Thereby the toothed portion 3e will come out of engagement with the toothed portion 2. The gear 1 now continues to drive the shaft 8 by means of the friction coupling 7. In this way, under the sliding of the friction clutch, the straight portion 3f at the clutch member 3 is permanently pressed against the portion 10d, thus achieving an exactly defined rest position of the clutch members 3 as in the other embodiments.

Fig. 4 is a view of the clutch arrangement according to Fig. 1 as seen from the right in direction of the shaft 8. In this drawing the gear 1 is omitted. This Fig. 4 shows the cooperation of the clutch throwout lever 10 with the clutch throwout cam 3c and the reset cam 3e. The clutch throwout lever consists of a lever pivoted upon a fixed pivot 10e and has one end 10a which rests upon one arm and a three-armed bell crank 12. The other end of the lever 10 is bifurcated and includes the turned-over portions 10d and 10c respectively. The portion 10d cooperates with the cam 3c and the portion 10c cooperates with the cam 3d. The spring 11 normally urges the lever 10 in a clockwise direction and against the arm 12a of the latch 12. The latch 12 is pivoted about a fixed pivot 12d by means of a release element 14 which exerts a force in the direction of the arrow against the arm 12c of the bell-crank causing it to partially rotate in a clockwise direction against the tension of spring 13. As the latch 12 rotates, the end 10a of the lever 10 slips off the top of the arm 12a and is urged in a clockwise direction by reason of the force exerted by spring 11. This clockwise rotation of the lever 10 causes the portion 10d of the lever to be removed from the path of the throwout cam 3c and the spring 15 of Figs. 1, 2 and 3 causes the driven member 3 to be moved axially and into engagement with the driving member 2. Rotation thereupon occurs and the portion 10c of the lever 10 is caused to follow the cam surface of the reset cam 3d and which causes the lever 10 to move in a counterclockwise direction about the pivot 10e. If, in the meantime, the latch release element 14 has been moved upward in a direction opposite to the arrow, and the bell-crank 12 has thereupon been caused to be partially rotated in a counterclockwise direction by spring 13, the portion 10a of the lever 10 will again be latched by the arm 12a after the high portion of the cam 3d has passed the arm 10c and the portion 10d is again placed in the path of the throwout cam 3c. This arrangement permits a single rotation to take place or continuous rotation to take place if the latch 12 is maintained in its clockwise position. Upon the removal of the latch release element 14, arm 12b of the latch will abut against the fixed stop 14a and thus limit its counterclockwise movement.

The arrangement described is particularly adapted for use in a printing telegraph typewriter or perforator since it is important to maintain precise axial positioning of a declutched driven element during such periods of disengagement. This invention insures this precise axial positioning and relatively small force is required to release the lever 10 by means of the latch arrangement described in connection with Fig. 4.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A clutch arrangement comprising a driving member, a driven member, stop means for stopping said driven member at a predetermined angular position, driving means for driving said driving member, a first clutch directly interposed between said driving member and said driven member, means for normally engaging said first clutch, slip coupling means coupling said driven member with said driving means, and disengaging means controlled by the slip coupling means for maintaining said driven member in said angular position against said stop means when said driven member is disengaged from said driving member by the actuation of said first clutch.

2. A clutch arrangement as claimed in claim 1, wherein said stop means comprises a throwout cam attached to said driven member, and said disengaging means comprises a movable stop arm adapted to be normally placed in the path of said throwout cam, said cam adapted to impart axial motion to said driven member upon engaging said stop arm.

3. A clutch arrangement as claimed in claim 2, further comprising means for moving said stop lever out of engagement with said throwout cam.

4. A clutch arrangement comprising a rotating shaft, a driving member coupled to said shaft, a driven member, clutch means for coupling said driving member to said driven member, controlled means for engaging and disengaging said clutch means comprising a clutch throwout cam, a clutch throwout lever movable into and out of the path of said throwout cam, and latch means for latching said lever in the path of said throwout cam to disengage the clutch means, means to move said latch means out of latching contact with said lever to engage the clutch means, and slip coupling means coupled between said shaft and said driven member for maintaining said lever into maximum contact with said throwout cam after disengagement of the driven member from said driving member.

5. A clutch arrangement as claimed in claim 4, wherein said latch means comprises a three-armed bell-crank, one arm of which is adapted to maintain said lever in the path of said throwout cam, another arm of which is adapted to be acted upon by said means for moving said latch means, the third arm of which is adapted to co-act against a fixed stop, and a spring element coupled to one of said arms for normally maintaining said third arm against said stop.

6. A clutch arrangement as claimed in claim 5, wherein said clutch throwout lever comprises a pivoted lever having one end adapted to cooperate with the first arm of said bell-crank and having bifurcations at the other end thereof, one of said bifurcated portions adapted to cooperate with said throwout cam and the other of said bifurcations adapted to cooperate with said re-set cam.

7. A clutch arrangement as claimed in claim 4, wherein said slip coupling means comprises a felt washer coupled between said shaft and said driven member.

References Cited in the file of this patent

UNITED STATES PATENTS

| | | |
|---|---|---|
| 855,275 | Beal | May 28, 1907 |
| 2,711,237 | Wylie | June 21, 1955 |